United States Patent
Gallant

(10) Patent No.: US 9,649,792 B2
(45) Date of Patent: May 16, 2017

(54) FORMING LONGITUDINALLY PLEATED PRODUCTS

(71) Applicant: Velcro BVBA, Deinze (BE)

(72) Inventor: Christopher M. Gallant, Nottingham, NH (US)

(73) Assignee: Velcro BVBA (BE)

( * ) Notice: Subject to any disclaimer, the term of this patent is extended or adjusted under 35 U.S.C. 154(b) by 189 days.

(21) Appl. No.: 14/503,602

(22) Filed: Oct. 1, 2014

(65) Prior Publication Data

US 2015/0104614 A1  Apr. 16, 2015

Related U.S. Application Data

(60) Provisional application No. 61/891,065, filed on Oct. 15, 2013.

(51) Int. Cl.
  *B29C 43/46* (2006.01)
  *B29C 47/32* (2006.01)
  (Continued)

(52) U.S. Cl.
  CPC ............ *B29C 43/46* (2013.01); *B29C 43/222* (2013.01); *B29C 43/28* (2013.01); *B29C 53/265* (2013.01);
  (Continued)

(58) Field of Classification Search
  CPC ..... B29C 43/28; B29C 43/222; B29C 43/226; B29C 2043/463; B29C 2043/461; B29C 43/46; B29C 2043/467; B29C 53/22; B29C 53/24; B29C 53/26; B29C 53/265; B29C 53/043; B29C 53/06; B29C 53/28; B29C 53/285; B29C 53/02; B29C 53/025; B29C 53/04; B29C 53/063; B29C 53/066;
  (Continued)

(56) References Cited

U.S. PATENT DOCUMENTS 2,224,713 A  12/1940  Wallace et al.
2,623,572 A  12/1952  Rudolf
(Continued)

FOREIGN PATENT DOCUMENTS

EP  1444079 B1  6/2010
EP  1165313 B2  9/2014
(Continued)

OTHER PUBLICATIONS

International Search Report and Written Opinion for PCT/EP2014/071891 mailed Mar. 17, 2015.

*Primary Examiner* — Jeffrey Wollschlager
(74) *Attorney, Agent, or Firm* — Fish & Richardson P.C.

(57) ABSTRACT

A method of forming a continuous sheet of pleated, hook-form, fastener product includes training a substrate about a pressure roll having an outer surface defining circumferential grooves. As the substrate approaches a nip between the pressure roll and a mold roll calendered with the pressure roll, a portion of the substrate is disposed within a corresponding one of the grooves between the pressure roll and a stationary horn extending into the groove whereby a longitudinally-extending pleat is formed in the substrate. The pleated substrate is then passed through the nip where resin regions are laminated to a side of the substrate opposed to the pleat.

15 Claims, 15 Drawing Sheets

(51) Int. Cl.
*B29C 53/26* (2006.01)
*B29C 43/22* (2006.01)
*B29C 43/28* (2006.01)
B29K 105/00 (2006.01)
B29K 101/12 (2006.01)
B29L 31/00 (2006.01)
A44B 18/00 (2006.01)

(52) U.S. Cl.
CPC .......... *A44B 18/0049* (2013.01); *B29C 47/32* (2013.01); *B29K 2101/12* (2013.01); *B29K 2105/256* (2013.01); *B29L 2031/729* (2013.01); *Y10T 428/2457* (2015.01)

(58) Field of Classification Search
CPC .............. B29C 47/32; B29K 2101/12; B29K 2105/256; B29L 2031/729; B29L 2031/14; A44B 18/0049; A44B 18/0046; A44B 18/0061; A44B 18/0065; A44B 18/006; B01D 41/0001; B01D 46/522
See application file for complete search history.

(56) References Cited

U.S. PATENT DOCUMENTS

| | | | |
|---|---|---|---|
| 2,747,064 A * | 5/1956 | Pappelendam | B21D 5/06 219/119 |
| 3,077,222 A * | 2/1963 | Shanley | B31F 1/2886 118/302 |
| 3,336,008 A | 8/1967 | Zoethout | |
| 3,350,484 A * | 10/1967 | Magill, Jr. | B29C 53/28 264/287 |
| 3,390,218 A | 6/1968 | Painter et al. | |
| 3,556,921 A * | 1/1971 | Painter | B29C 53/285 428/181 |
| 3,566,643 A * | 3/1971 | Westbarkey et al. | B21D 13/045 72/180 |
| 3,792,952 A * | 2/1974 | Hamon | B29C 53/285 425/336 |
| 3,969,473 A * | 7/1976 | Meek | B01J 19/32 261/112.1 |
| 4,090,385 A | 5/1978 | Packard | |
| 4,340,342 A * | 7/1982 | Kim | B26D 1/38 264/118 |
| 4,581,269 A | 4/1986 | Tilman | |
| 4,921,643 A | 5/1990 | Walton et al. | |
| 5,042,701 A | 8/1991 | Gale | |
| 5,089,202 A | 2/1992 | Lippold | |
| 5,256,231 A * | 10/1993 | Gorman | A44B 18/0011 156/178 |
| 5,260,015 A | 11/1993 | Kennedy et al. | |
| 5,681,302 A * | 10/1997 | Melbye | A61F 13/15593 604/373 |
| 5,741,389 A * | 4/1998 | Yoshino | B05B 15/0456 156/187 |
| 5,888,607 A * | 3/1999 | Seth | A44B 18/0011 428/101 |
| 6,205,623 B1 | 3/2001 | Shepard et al. | |
| 6,302,676 B1 | 10/2001 | Kato et al. | |
| 6,481,063 B2 | 11/2002 | Shepard et al. | |
| 6,827,893 B2 * | 12/2004 | Clune | A44B 18/0049 24/442 |
| 6,887,553 B1 * | 5/2005 | Heil | B05B 15/0456 118/505 |
| 6,913,786 B2 | 7/2005 | Proulx et al. | |
| 7,048,818 B2 * | 5/2006 | Krantz | A44B 18/0049 156/244.25 |
| 7,172,008 B2 | 2/2007 | Vanbenschoten et al. | |
| 7,223,314 B2 | 5/2007 | Provost | |
| 7,303,711 B2 | 12/2007 | Gallant et al. | |
| 7,395,583 B2 * | 7/2008 | Clune | A44B 18/0011 24/442 |
| 7,601,284 B2 | 10/2009 | Clune | |
| 7,691,760 B2 * | 4/2010 | Bergsten | A47L 13/16 15/208 |
| 8,079,995 B2 | 12/2011 | Tachauer et al. | |
| 8,608,721 B2 | 12/2013 | Tachauer et al. | |
| 8,685,194 B2 | 4/2014 | Grady et al. | |
| 8,778,243 B2 | 7/2014 | Shepard et al. | |
| 2001/0016245 A1 | 8/2001 | Tuman et al. | |
| 2001/0018110 A1 | 8/2001 | Tuman et al. | |
| 2002/0022108 A1 * | 2/2002 | Krantz | A44B 18/0049 428/100 |
| 2002/0023321 A1 * | 2/2002 | Clune | A44B 18/0049 24/306 |
| 2003/0074768 A1 | 4/2003 | Shepard et al. | |
| 2003/0085485 A1 | 5/2003 | Seidel et al. | |
| 2003/0228078 A1 * | 12/2003 | Clune | A44B 18/0084 383/93 |
| 2004/0016565 A1 * | 1/2004 | Gallant | B29C 43/222 174/117 F |
| 2004/0124133 A1 * | 7/2004 | Irie | B01D 63/10 210/321.83 |
| 2004/0131731 A1 * | 7/2004 | Shepard | A44B 18/0084 426/106 |
| 2005/0101930 A1 | 5/2005 | Tachauer et al. | |
| 2006/0049545 A1 * | 3/2006 | Gallant | B29C 43/222 264/272.11 |
| 2006/0226571 A1 | 10/2006 | Clune | |
| 2007/0069559 A1 | 3/2007 | Poulakis | |
| 2010/0060051 A1 | 3/2010 | Poulakis | |
| 2011/0095448 A1 | 4/2011 | Rasmussen | |
| 2013/0065009 A1 | 3/2013 | Katsumoto et al. | |
| 2013/0280474 A1 * | 10/2013 | Medina | B32B 3/06 428/99 |
| 2014/0231568 A1 * | 8/2014 | Mellin | B31C 1/00 242/160.1 |

FOREIGN PATENT DOCUMENTS

| | | |
|---|---|---|
| WO | WO0050229 A1 | 8/2000 |
| WO | WO0167912 A3 | 6/2002 |
| WO | WO03039833 A1 | 5/2003 |
| WO | WO2006121695 A1 | 11/2006 |
| WO | WO2012066418 A3 | 7/2012 |

* cited by examiner

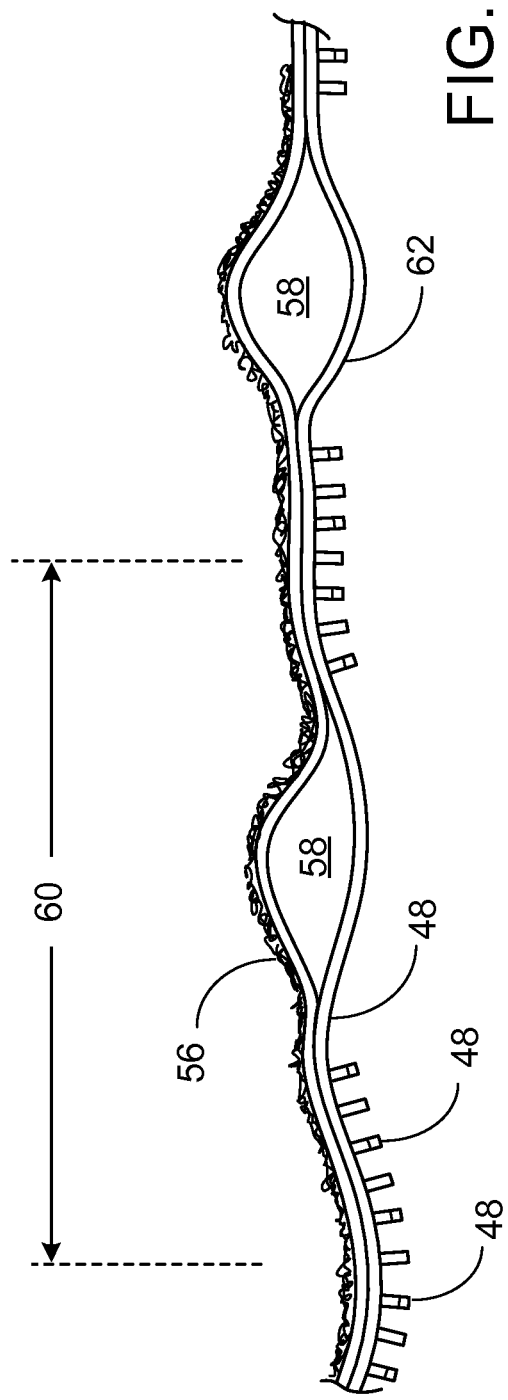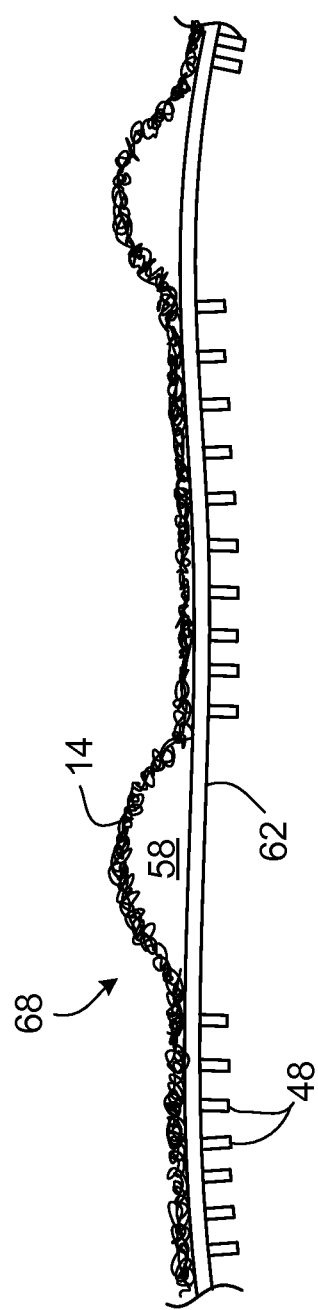

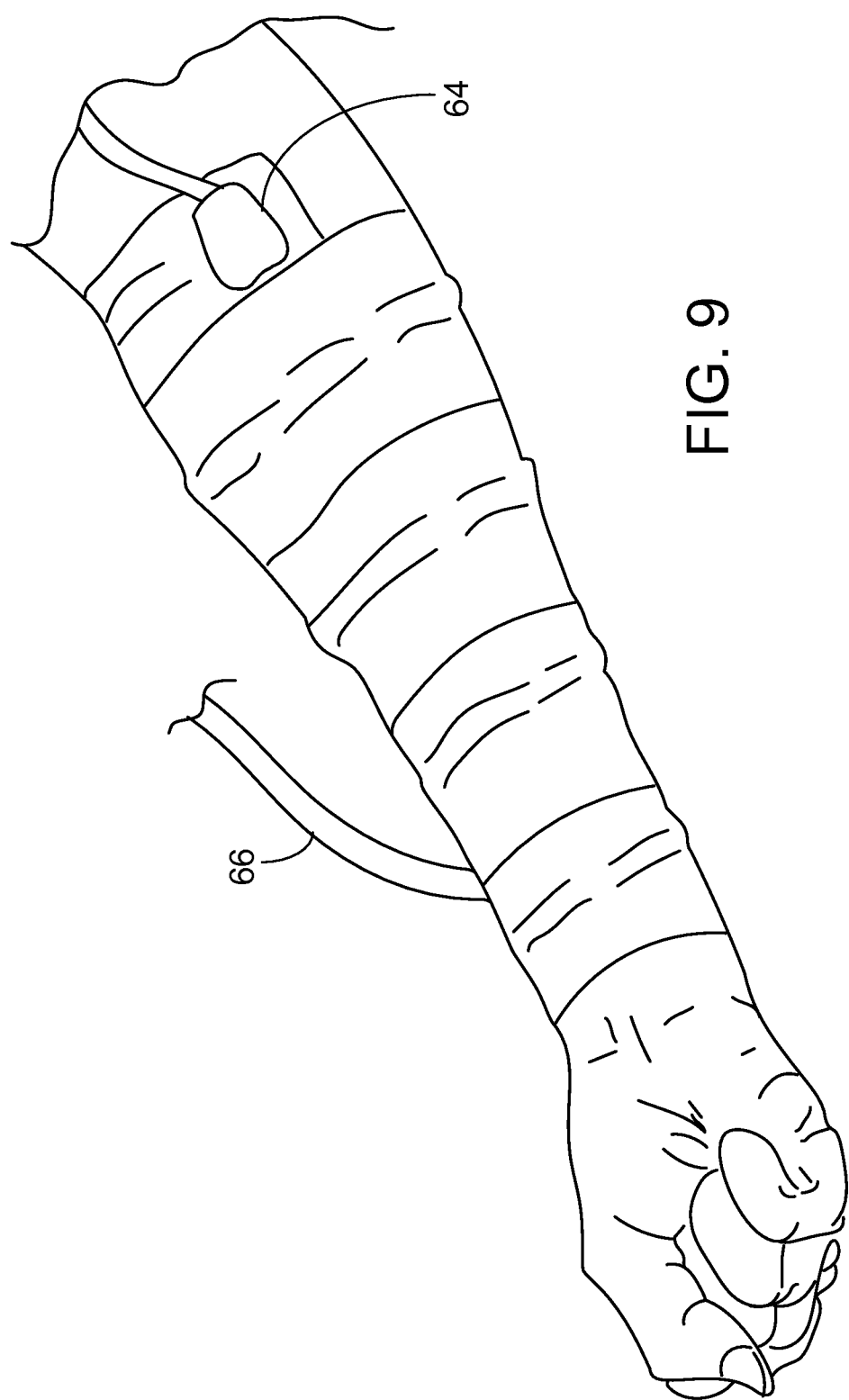

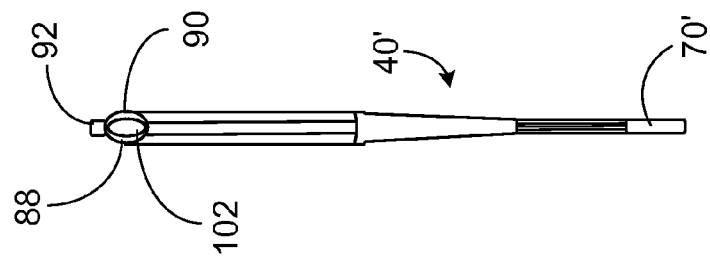
FIG. 19
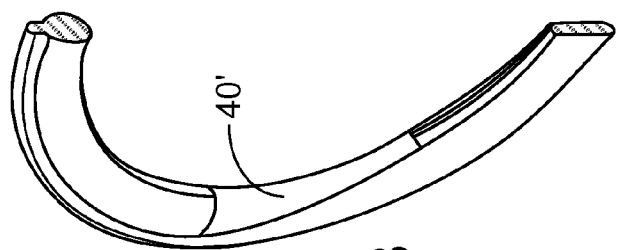
FIG. 18
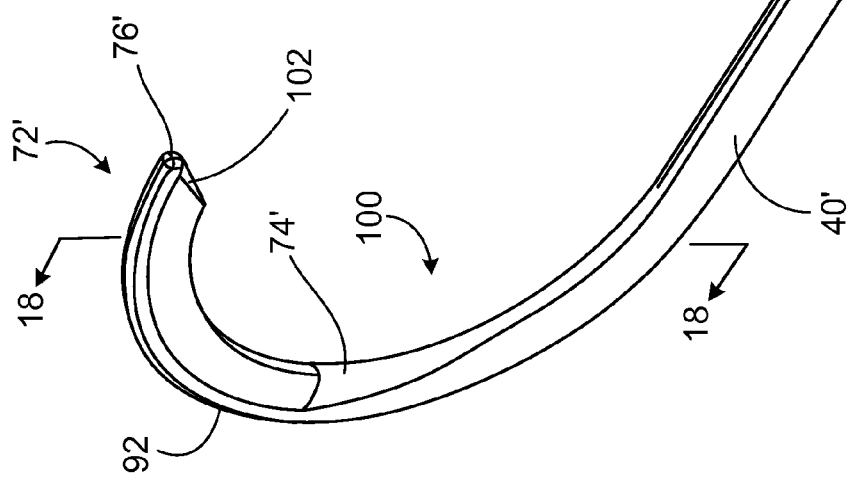
FIG. 17
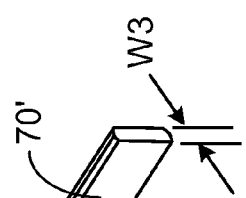

FORMING LONGITUDINALLY PLEATED PRODUCTS

TECHNICAL FIELD

This invention relates generally to processing longitudinally continuous, flexible substrates with longitudinal pleats, and in particular to forming continuous laminations having regions having touch fastener elements, and to such laminated fastener materials.

BACKGROUND

Arrays of male touch fastener elements, e.g., loop-engageable hooks, may be provided on a surface of a flexible sheet-form substrate, such as by passing the substrate through a molding nip with moldable resin, and forcing the resin into miniature cavities to form complete fastener elements, or fastener element preforms, extending from a layer of resin laminated to the substrate surface. It has been more recently taught that such methods can be performed so as to provide fastener elements on only limited regions of the substrate surface, such as spaced-apart longitudinal lanes or islands, leaving other surface regions free of the resin and exposed. Improvements in the methods of making such products, and in processing longitudinally continuous flexible substrates in general, are sought.

SUMMARY

One aspect of the invention features a method of forming a longitudinally continuous sheet of pleated product. The method includes training a substrate about a first roll having an outer surface defining a circumferential groove between outer surface lands such that, as the substrate approaches a nip between the first roll and a second roll, a first region of the substrate is disposed within the groove so as to reside between the first roll and a stationary horn extending into the groove, and adjacent, second regions of the substrate extend across the lands on each side of the groove. The substrate is passed through the nip in a machine feed direction with the first region disposed within the groove, thereby applying nip pressure to the second regions of the substrate in the nip, and transferred to the second roll at the nip. The transferred substrate is maintained against the second roll over a distance extending from the nip, over which distance the second regions of the substrate are supported by the outer surface of the second roll and the first region forms a pleat on a side of the substrate opposite the second roll.

In some examples, the method also includes introducing a resin into the nip with the substrate, and bonding the extruded resin to the substrate. The resin may be extruded into the nip in a continuous flow, for example, and in some cases is introduced to the nip in discrete, spaced-apart regions on either side of the groove.

In some embodiments, the resin is introduced to the nip in a flow that extends across the groove and forms a layer of resin extending across the pleat. For some applications, the method includes longitudinally slitting the layer of resin extending across the pleat, to open the pleat.

In some arrangements, the groove is at least partially defined between opposing flat annular surfaces of the first roll. For example, the horn may have flat side surfaces that oppose the flat annular surfaces of the first roll, and over which the substrate slides. The horn may have a lateral width, internal to the first roll, which is greater than a lateral opening width of the groove. In some instances the horn has convex side surfaces nested within concave surfaces of the first roll.

In many embodiments, the second roll defines discrete molding cavities extending into the second roll opposite the lands of the first roll, the method comprising forcing resin into the discrete molding cavities to mold fastener element stems extending from a layer of resin laminated to the substrate. In some examples, the discrete molding cavities are each shaped to form touch fastener elements with loop-engageable heads.

The second roll, in some examples of the method, has a radially-extending flange extending into the groove of the first roll at the nip, and the pleat envelops the flange as the substrate leaves the nip.

In some examples the method also includes removing the transferred substrate from the second roll, opening the pleat downstream of the second roll, and then spooling the substrate with the pleat opened. In some other examples, the method also includes folding the pleat against an adjacent surface of the substrate downstream of the second roll, and then spooling the substrate with the pleat folded.

In some embodiments, the groove is one of a series of circumferential grooves defined in the outer surface of the first roll, into which grooves respective horns extend. The substrate is trained about the first roll such that, as the substrate approaches the nip, longitudinal, spaced-apart sections of the substrate are disposed within respective ones of the grooves and form respective, spaced-apart pleats on the side of the substrate opposite the second roll.

Another aspect of the invention features a method of spooling a longitudinally continuous, flexible sheet-form product of greater overall thickness in two spaced-apart regions than in a longitudinal region between the spaced-apart regions. The method includes forming a longitudinal pleat of the product within the longitudinal region, folding the pleat against a surface of the product to form a longitudinally continuous section having three overlapping layers of the product disposed between the spaced-apart regions, and then spooling the product onto a roll to form a spool in which each successive course of the product overlays the folded pleat of a preceding course.

In some examples the product includes a width-wise continuous substrate extending across the spaced-apart regions and the longitudinal region, and layers of resin laminated to the substrate in the spaced-apart regions, with the folded pleat disposed between the layers of resin. In some cases the layers of resin are longitudinally continuous within the spaced-apart regions. The pleat may be folded against a side of the substrate opposite a side carrying the layers of resin, for example.

In some cases, with the pleat folded the longitudinally continuous section having three overlapping layers of the product has a net thickness approximating the thickness of the product in the spaced-apart regions. Such a configuration can help to stabilize spooled product, for example.

In some embodiments, spooling the product includes winding the product in a non-spiraled manner, such that longitudinal edges of the product remain perpendicular to a rotational axis of the spool.

In some configurations, the pleat is formed adjacent an edge of one of the two spaced-apart regions, and is formed to have an overall pleat height such that the pleat, as folded, extends to adjacent the other of the two spaced-apart regions.

In some cases, the product has multiple, spaced-apart regions of greater thickness than in longitudinal regions of the product between the spaced-apart regions. The method includes forming and folding respective longitudinal pleats of the product in each of the longitudinal regions between the spaced-apart regions, prior to spooling the product.

Another aspect of the invention features a spooled, flexible, sheet-form product of finite width between longitudinal edges, the product having two regions of relatively greater thickness, separated by a longitudinally continuous region of relatively lesser thickness. The product is spooled in a pleated state in which, within each course, the region of relatively lesser thickness forms a longitudinal pleat overlying the product completely within the region of relatively lesser thickness.

In some embodiments, in adjacent courses of the spooled product the regions of relatively greater thicknesses overlie one another. For some applications, the product is preferably spooled in a non-spiraled manner.

In some examples, the product includes a width-wise continuous substrate extending across the regions of relatively greater thickness and the longitudinally continuous region of relatively lesser thickness, and layers of resin laminated to the substrate in the regions of relatively greater thickness. The folded pleat is disposed between the layers of resin. In some cases, the layers of resin are longitudinally continuous within the regions of relatively greater thickness.

In some configurations, the pleat is folded against a side of the substrate opposite a side carrying the layers of resin.

The product, in some examples, also includes arrays of touch fastener elements extending from, and formed of resin contiguous with, respective ones of the layers of resin.

Each layer of resin may include, or be formed by, multiple islands of resin bonded to the substrate and spaced apart longitudinally.

In some embodiments, the spooled product has a net thickness, between the two regions of relatively greater thickness and including the folded pleat, approximating the thickness of the product in the regions of relatively greater thickness.

In some examples the pleat includes a doubled-over portion of the substrate having a longitudinally-extending fold edge, where the doubled-over portion overlies an adjacent portion of the substrate such that, in each course, the spooled product has a section with three overlapping layers of substrate.

Another aspect of the invention features a flexible, sheet-form product including a substrate having first and second opposite sides. The substrate defines a pleat extending from a pleat base toward the first side of the substrate. A resin layer is bonded to the second side of the substrate and extends across the pleat base. The product also includes an array of discrete touch fastener elements with resin stems extending from and contiguous with the resin layer.

In many examples, the product is of a continuous length and finite width defined between longitudinal edges, and the pleat extends longitudinally in parallel with and between the longitudinal edges. The resin layer may include a longitudinally continuous lane of resin overlying the pleat base, for example.

In some instances the pleat forms a tube defining an interior cavity extending along the pleat. The tube, in some products, is bounded by air-impermeable surfaces and can be thus employed as a conduit or reservoir for liquids. In some other products, the tube is at least partially bounded by an air-permeable portion of the substrate. Such a tube may serve to conduct and disperse air (or even liquid) through the substrate, such as to ventilate skin against which the substrate is placed. Other functions of such a product are also envisioned.

Yet another aspect of the invention features a substrate pleating and processing machine defining a machine feed path along which a longitudinally continuous substrate is fed. The machine includes a first roll defining a rotational axis and having an outer surface defining a circumferential groove, a second roll arranged for counter-rotation with respect to the first roll and having an outer surface arranged in cooperation with the outer surface of the first roll to form a substrate processing nip, and a stationary substrate pleating horn. The horn includes an introducing end disposed outside of the groove, a releasing end disposed within the groove at a location downstream from the introducing end and upstream from the nip with respect to the machine feed path, and a curved portion connecting the introducing and releasing ends and extending into the groove.

In some embodiments, the horn has a radial width that decreases in approach to the releasing end.

In some examples, the releasing end of the horn terminates adjacent the nip.

The machine, in some configurations, also includes an extruder arranged to introduce resin into the nip between the substrate and the outer surface of the second roll. The extruder may be arranged to introduce the resin in discrete, spaced-apart regions on either side of the groove, for example.

In some instances, the groove is at least partially defined between opposing flat annular surfaces of the first roll. In such cases, the horn may have flat side surfaces that oppose the flat annular surfaces of the first roll, and over which the substrate slides.

The horn may have a lateral width, internal to the first roll, greater than a lateral opening width of the groove. In some cases, the horn has convex side surfaces nested within concave surfaces of the first roll.

In some embodiments, the second roll defines discrete molding cavities extending into the second roll opposite the lands of the first roll. The discrete molding cavities may each be shaped to form touch fastener elements with loop-engageable heads, for example.

In some cases, the second roll includes a radially-extending flange extending into the groove of the first roll at the nip.

In some arrangements, the groove is one of a series of circumferential grooves defined in the outer surface of the first roll and into which grooves respective horns extend.

Forming longitudinal pleats in a substrate upstream of a processing nip can advantageously reduce the required nip width and can, in some instances, result in beneficial product features or characteristics of the processed substrate, particularly when the substrate undergoes a lamination process or an in situ molding process in the nip. As used herein, the term pleat refers to a region of the substrate in which two adjacent portions of a single face of the substrate oppose one another on opposite sides of a fold, and the term fold refers to a bend or crease. In some embodiments, a substrate of expanded width can then be fed into a conventional-width calender nip, with the substrate entering the calender nip in a pleated state, whereby the effective width of the substrate is reduced. Reductions in necessary calender nip width can reduce the overall cost of the apparatus, as well as the induced roll bending loads. Such improvements can be particularly advantageous in the case of mold rolls formed of stacked mold plates. Moreover, the laminating capacity of the calender system, in terms of processed substrate area, can be increased for a given nip width. This increase in capacity can result in a significant reduction in cost of the finished product, per unit area.

Substrate pleats formed between longitudinally-extending lanes of laminated areas, such as those with molded male fastener elements, can also be advantageously folded to increase the relative thickness of the sheet-form product between the lanes. This can help to increase the stability of a spool of such product, as compared to the same product without folded pleats.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 8 is a lateral section view of a laminate formed to have sealed longitudinal tube sections between arrays of fastener elements.

FIG. 9 shows a section of the laminate of FIG. 8, wrapped about an arm as a cooling bandage.

FIG. 10 is a lateral section view of a laminate formed to have fluid-permeable longitudinal tube sections between arrays of fastener elements.

FIG. 17 is a sectioned perspective view of a horn of the pressure roll assembly of FIG. 14.

FIG. 18 is a sectioned perspective view of the horn of FIG. 17, cut at line 18-18.

FIG. 19 is a front view of the horn of FIG. 17.

Like reference numbers represent like elements.

DETAILED DESCRIPTION

Figure 1:
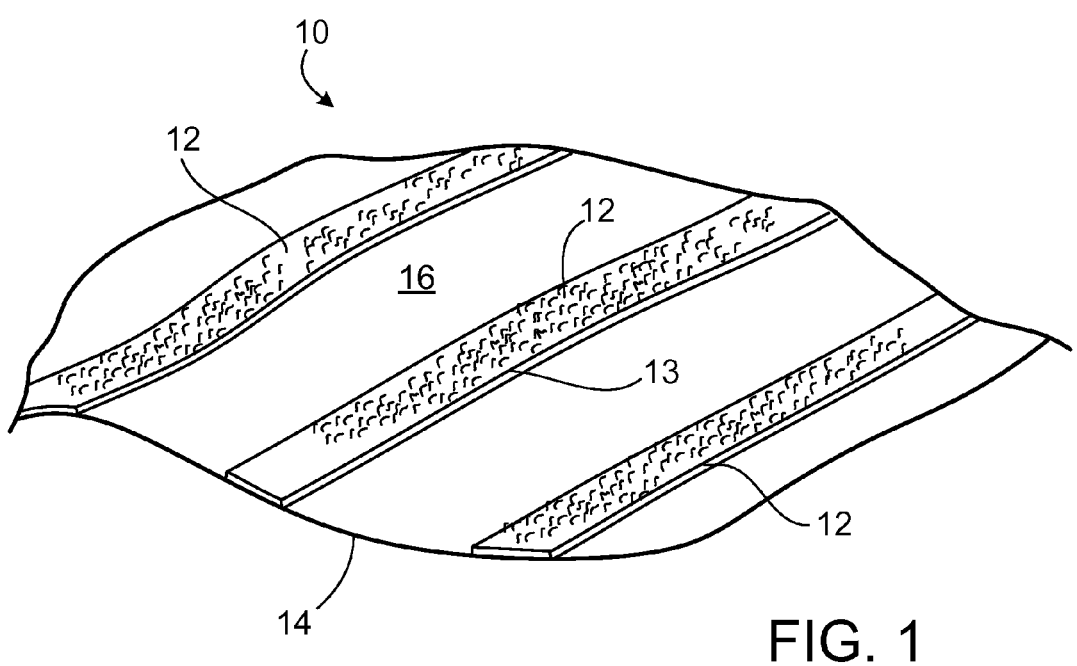
FIG. 1 is a perspective view of a portion of a fastening product having spaced lanes of fastener elements bounding exposed regions of substrate.

Referring first to FIG. 1, a flexible sheet 10 of fastener material has spaced-apart, parallel, longitudinal lanes 12 of touch fastener elements. The lanes 12 each have a thin resin base 13 laminated to a side surface 16 of a flexible substrate 14, such as a fabric. The fabric may be, for example, a non-woven or knit material, and may feature fibers that are releasably engageable with the fastener elements. Each lane may be, for example, 5 to 50 mm in width, and may be separated from adjacent lanes by exposed 10 to 100 mm widths of the substrate surface. The resin bases of the lanes may have a thickness of 0.1 mm or less, as measured from the substrate surface, and in some cases are of negligible thickness. The touch fastener elements have discrete, spaced-apart resin stems extending from the lanes 12, and may be disposed in arrays with rows and columns of fastener elements, at a density of, for example, 70 to 300 fastener elements per square cm. Each fastener element may have a height, as measured from the resin base from which it extends, of only about 0.2 to 0.6 mm. The fastener elements have heads that overhang the sides of their stems for releasable engagement of fibers. In some cases, the fastener elements are configured to releasably engage mating arrays of other male fastener element arrays. Several touch fastener element shapes are known in the art. While illustrated for simplicity with fastener elements in only some regions of the lanes, it will be understood that each lane 12 is essentially covered with its array of fastener elements. In some cases, each lane consists of a longitudinal series of discrete islands of fastener elements, each surrounded by exposed substrate.

Substrate 14 is very flexible, and lanes 12 are preferably thin and flexible enough to not significantly impair the flexibility of the sheet. The substrate may be a non-woven or knit fabric with a basis weight of 50-500 gsm, for example. In other examples, the substrate is a woven product, or a paper or film. Such striated fastener sheets can be cut into discrete fastener products, such as fastening tabs for diapers and other disposable personal care products, or to produce bandages or fastening straps, for example.

Figure 2:
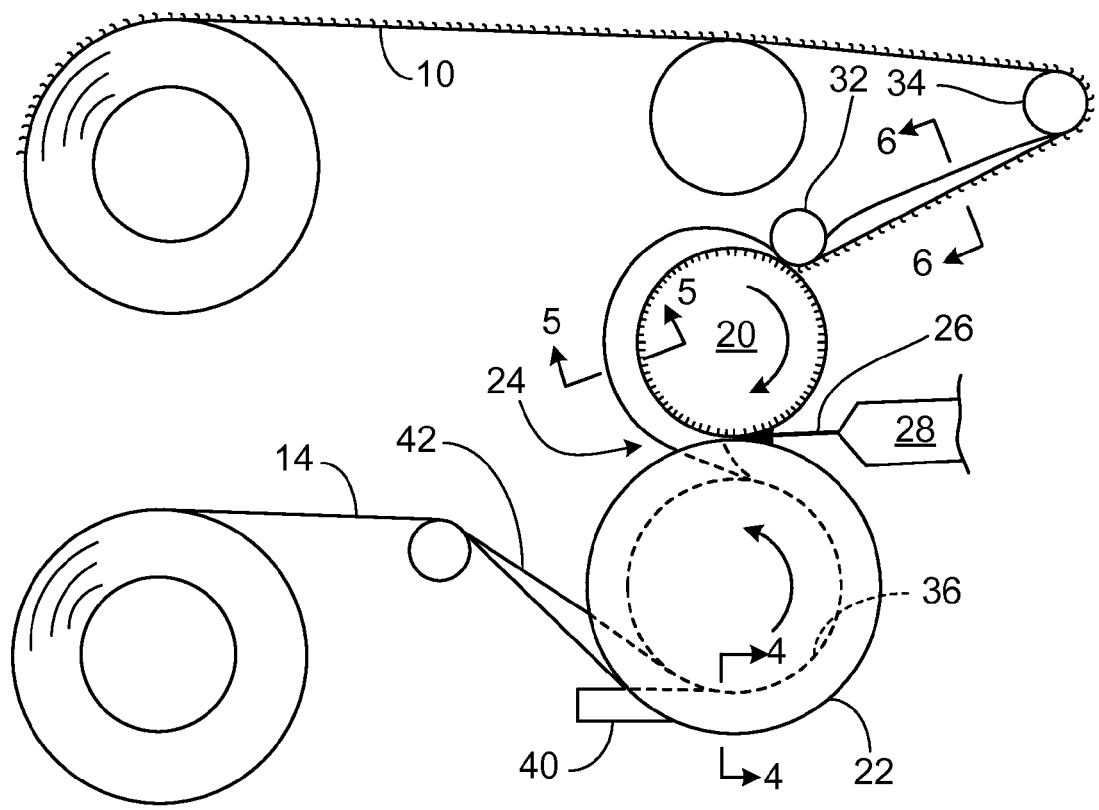
FIG. 2 is a schematic illustration of an apparatus and method for laminating resin onto a pleated product, while forming fastener elements.

Referring next to FIG. 2, a method and apparatus for manufacturing fastening sheet 10 features a rotating mold roll 20 of the sort taught by Fischer in U.S. Pat. No. 4,872,243, or by Kennedy et al. in U.S. Pat. No. 5,260,015, for example. The cylindrical surface of mold roll 20 is formed from an axial stack of plates or rings that define an array of blind cavities extending into the roll. In many cases, the cavities are each shaped to form an overhanging fastener element. In some other cases, the cavities are shaped to form straight stems without overhanging heads, as is known in the art. A pressure roll 22 is positioned to cooperate with mold roll 20 to form a nip 24 extending along a working length of the mold roll.

Figure 3:
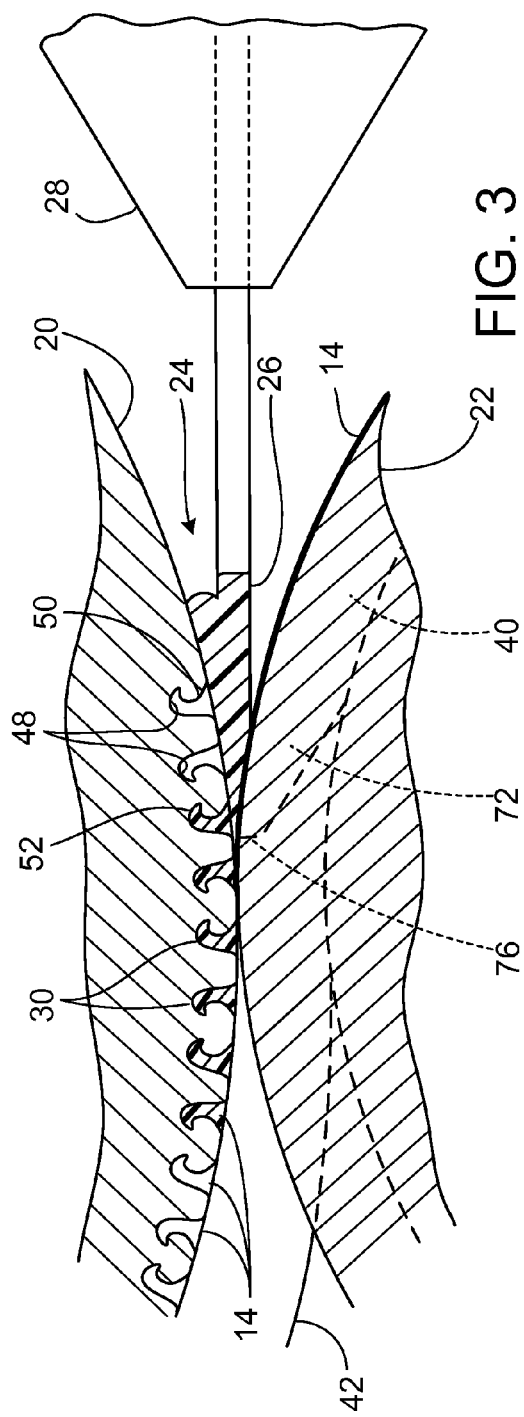
FIG. 3 is an enlarged, partial cross-section view through the molding nip of the apparatus of FIG. 2, showing the filling of mold cavities with resin.

Referring also to FIG. 3, moldable resin 26 is continually introduced to the nip from an extruder 28, forming a bank of resin that is drawn into the nip under high shear. Substrate 14 is introduced to nip 24 on pressure roll 22, and passes through the nip with the moldable resin between the substrate and the mold roll. Pressure in nip 24 forces the resin into the cavities 30 of the mold roll, where it is chilled and solidifies into fastener elements as the resin travels with the mold roll away from nip 24. Nip pressure also laminates resin remaining on the mold roll surface with the substrate 14, in some cases by forcing the moldable resin into pores or to encapsulate surface features of the substrate, thereby forming the resin bases permanently secured to the substrate surface.

Once the resin has sufficiently chilled, the substrate and laminated resin is stripped from the mold roll surface about a stripping roll 32, and eventually spooled for shipment as a continuous sheet, slit into separate strips and then spooled, or cut into discrete fastener products. If the features molded in the cavities of the mold roll are headless stems, such stems can be processed to form heads, such as by heating and/or deforming their ends, prior to spooling.

One difference between the process illustrated in FIG. 2 and that taught by Kennedy et al. is that substrate 14 is introduced to molding nip 24 in a longitudinally pleated condition, as will be discussed in more detail below. The substrate remains in its pleated condition during the molding of the resin on the mold roll. Following stripping, the laminated sheet may be passed about a spreading roll, thereby spreading the material widthwise to remove the pleats before spooling. In some other examples, the pleats are retained and the pleated product is spooled. Stripping roll 32 may be a smooth cylindrical roll configured to flatten the pleats against the back side of the laminate as shown, or may itself define circumferential grooves that receive the pleats and prevent them from being flattened against the laminate during stripping.

Figure 4:
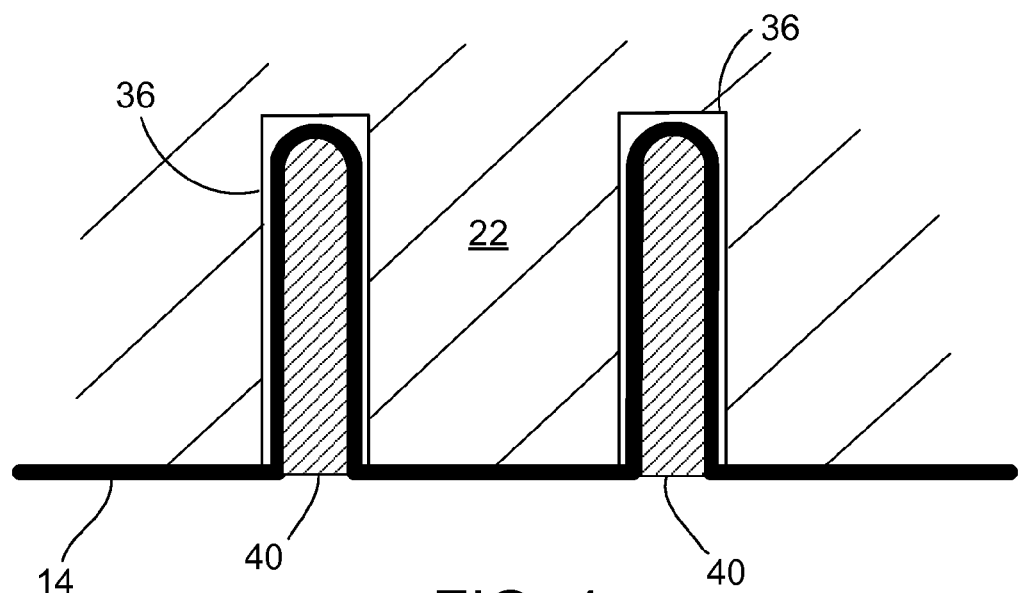
FIGS. 4 and 5 are cross-sectional views, taken along lines 4-4 and 5-5, respectively, in FIG. 2.
Figure 7:
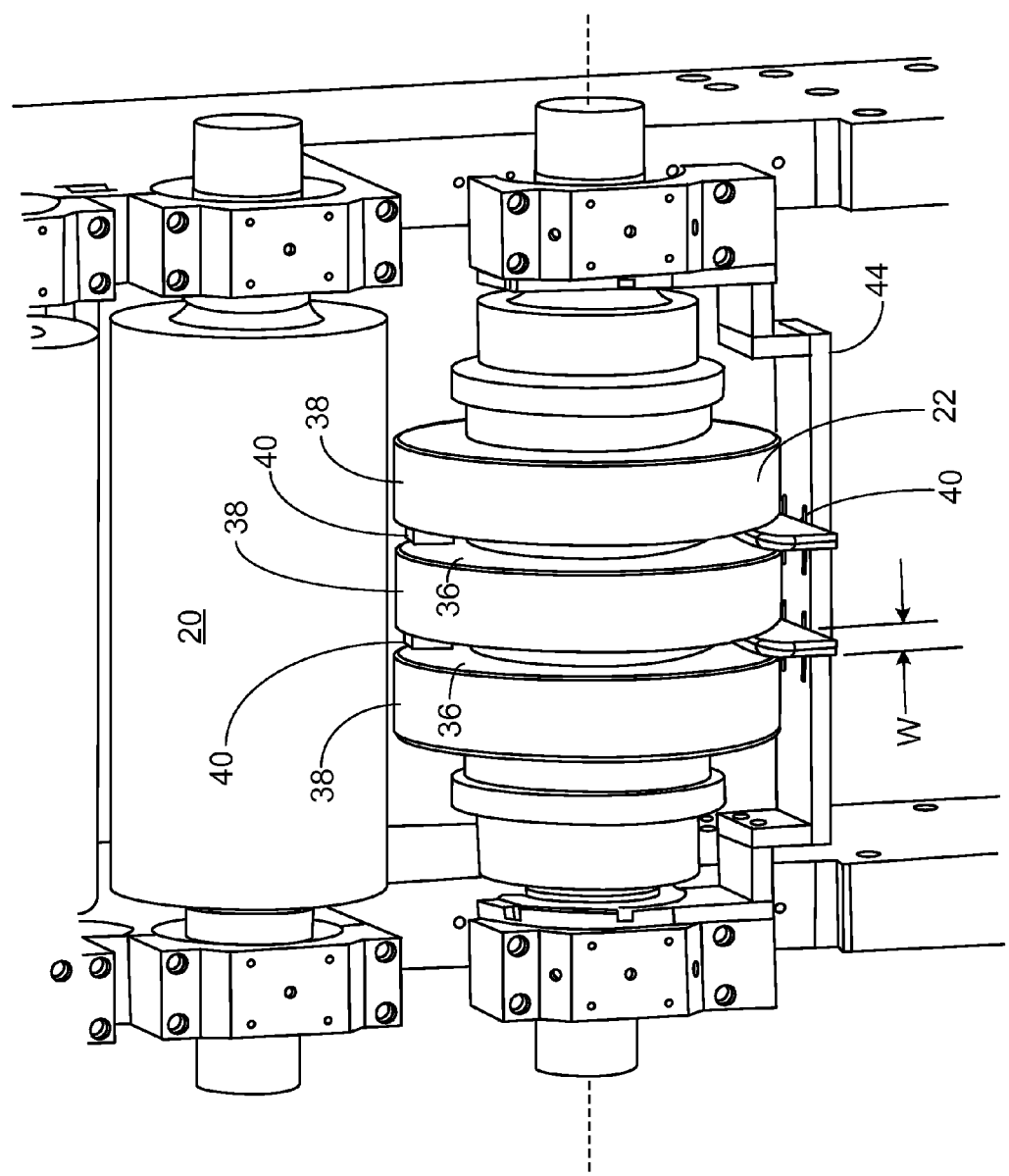
FIG. 7 shows the pressure and mold rolls of the apparatus of FIG. 2, mounted to a frame.

Referring also to FIGS. 4 and 7, the pleats are formed as the substrate 14 is introduced to pressure roll 22, which is provided with deep annular slots defined between cylindrical portions 38 of equal diameter. The widths of substrates that form the pleats are forced into these slots and travel in the slots in approach to the molding nip. They are forced into, and held in, the slots by stationary shoes 40 secured to a shoe support 44. As shown in FIG. 2, as the substrate approaches pressure roll 22, the overall running width of the substrate is reduced as the pleats 42 are formed. The substrate is fed under tension onto an outer surface of the pressure roll 22, and between the pressure roll and the shoes 40 disposed in slots 36 to form the pleats. The pressure roll 22 directs the pleated substrate 14 into the molding nip 24.

Figure 6:
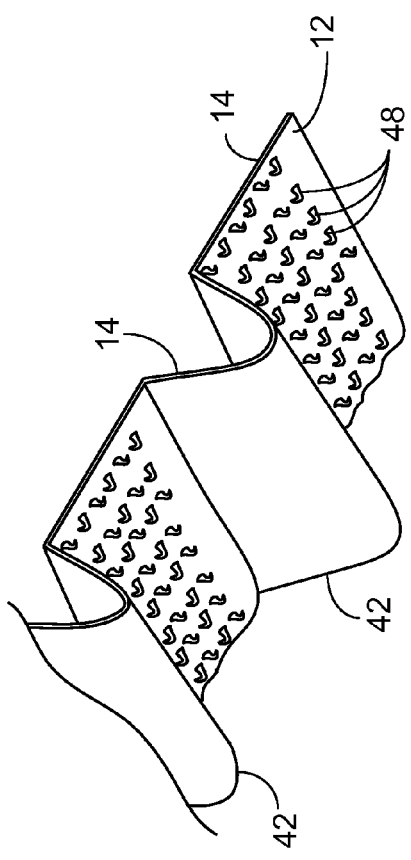
FIG. 6 is a perspective view of a portion of the product formed on the apparatus of FIG. 2, taken at line 6-6 in FIG. 2.
Figure 5:
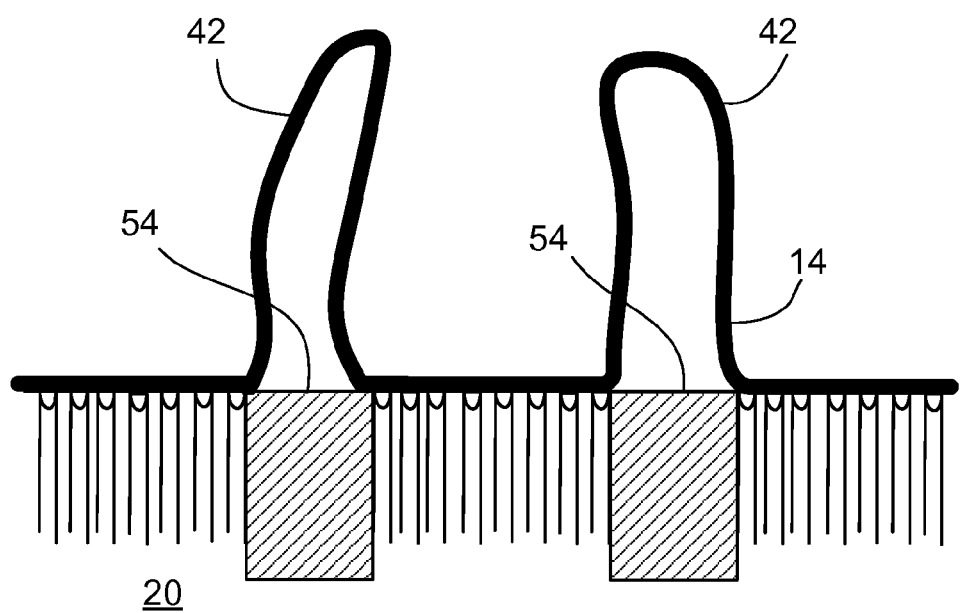

Referring to FIGS. 3 and 6, the discrete cavities 30 of mold roll 20 are shaped to form fastener elements 48, each having a molded stem 50 rising from a layer of resin 26 formed on the outer surface of the mold roll to a loop-engageable head 52. As noted above, such fastener elements are generally between about 0.2 to 2.0 mm in overall height. The distribution of mold cavities 30 in the peripheral surface of mold roll 20 determines the distribution of molded fastener elements 48. In the mold roll structure shown in FIG. 5, discrete stacks of mold plates form circumferential bands of cavities that are spaced from adjacent bands by cavity-free spacer rings 54 arranged to align with pleats 42. In this example, the resin is supplied to the nip in spaced apart, parallel flows, each flow introduced to a respective band of cavities and corresponding to a fastening lane of the finished product. In this manner, pleats 42 remain free of resin. Alternatively, the resin may be supplied in a widthwise continuous sheet that spans all of the bands of cavities, in which case the portions of resin engaging the spacer rings forms a thin layer of resin bridging the two edges of the pleat.

Such a method may be employed, for example, to form a fastener product defining longitudinal tubes running along its length. The product shown in FIG. 8, for example, is formed by using as a substrate a film-backed non-woven loop material 56 as the substrate. The film backing of the substrate is selected to bond with the resin solidified on the surface of the mold roll, such that along the fastener lanes of the finished product the substrate is intimately and permanently bonded with the resin layer from which the fastener elements extend. In between the lanes, however, the layer formed from the extruded resin solidifies against the mold roll surface while spaced from the pleat of substrate, such that a longitudinal cavity 58 is formed between the chilled resin and the substrate, which together form parallel, sealed tubes 62 integral with the product. Such a product can be longitudinally slit, such as along either side of width 60, to produce strips that can be wrapped about an object, with the fastener elements releasably engaging exposed fibers of the substrate surface to hold the strip in place. Such a strip can be, for example, a bandage that can be spirally wrapped about injured tissue, with each course partially overlapping the previous course to engage the fastener elements. FIG. 9 shows such a cooling bandage, with fitments 64 connecting flow tubes 66 to either end of the internal channel of the bandage. The channel is otherwise sealed at the bandage ends, such as by welds across the width of the bandage. In another example, a ventilated fastening sheet 68 (FIG. 10) has longitudinal channels 58 between the resin layer and a porous fabric substrate 14. The substrate porosity is selected to allow fluid to pass from channels 58 into the surrounding environment under pressure. Such a product can be configured for use as a ventilating bandage, for example, with cooling air pumped into the channels from one end of the bandage and flowing through the substrate against the skin. Another use is as an irrigation mat, with water under pressure in the channels seeping through the substrate and into the soil.

While the above examples have featured the extrusion of longitudinally continuous lanes, or full widths, of molten resin into the forming nip, pleated fastener products may also be formed to have longitudinally discontinuous patterns of hooks, such as by introducing the molten resin as discrete islands of resin, carried into the molding nip on either the surface of the substrate or the surface of the mold roll. Furthermore, the method can be conducted without molding any projections, such as by using a smooth-surfaced roll in place of mold roll 20. The pleat-calendering methods discussed below can also be employed to produce and process longitudinally pleated material without any lamination, such as by configuring roll 20 to apply heat and pressure to the unpleated regions of the substrate.

Referring back to FIG. 7, mold roll 20 and pressure roll 22 are supported within a frame so as to rotate about parallel longitudinal axes. The pressure roll bearing blocks may be mounted so as to allow the pressure roll to be moved toward the mold roll, and/or to adjust the pressure developed in the molding nip. In this example, grooves 36 are defined between pairs of flat annular walls of the pressure roll 22, such that the grooves are of uniform longitudinal width W throughout their depth. The grooves 36 may be formed, for example, by machining the pressure roll outer surface, or by forming pressure roll 22 as an assembly of first rings having a first diameter and second rings having a second diameter that is less than the first diameter. In the assembly, the first rings alternate with second rings along the pressure roll axis so as to provide the grooved outer surface.

Figure 11:
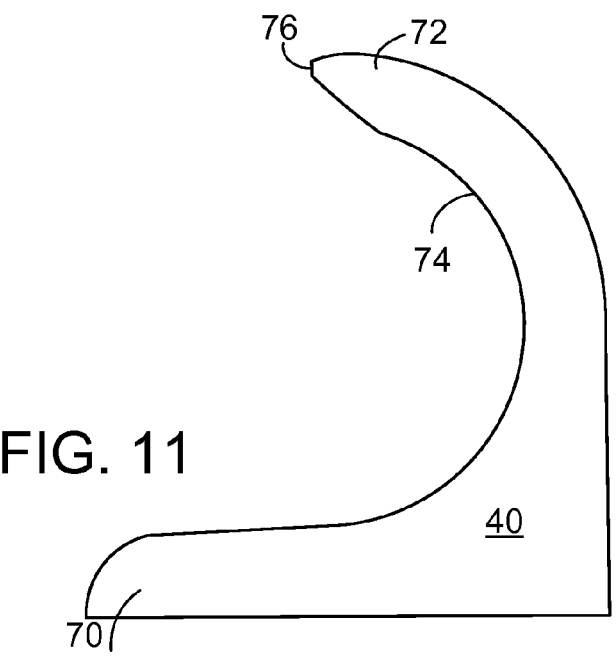
FIG. 11 is a side view of one of the horns of the apparatus of FIG. 2

Referring also to FIG. 11, a J-shaped, rigid, stationary horn 40 extends into each of the grooves 36, terminating near the molding nip. The horns 40 are configured to pleat the substrate 14 by directing portions of the substrate into the groove as the substrate travels about the pressure roll 22. The horns 40 are also configured to facilitate transfer of substrate 14 from pressure roll 22 onto mold roll 20. Each horn 40 has a cross-sectional shape that generally corresponds to that of the groove 36 in which it is disposed. In this example, horns 40 have a generally rectangular cross-section and a rounded inner surface. Sufficient clearance is provided between horns 40 and the pressure roll surfaces to permit the substrate 14 to slide along the horn surfaces. Each horn 40 has an introducing end 70, a releasing end 72 at its opposite extent, and an inner surface 74 that is curved to follow the curvature of the base of the pressure roll groove into which it is inserted. The introducing end 70 extends tangentially outward from the groove 40, toward the incoming substrate. The releasing end 72 terminates in a tapered portion in which the radial thickness of the horn decreases toward the distal tip 76 of the horn, thereby helping to avoid snagging the pleat sliding over the horn as the curvature of the substrate transfers from following the pressure roll to following mold roll 20, thereby facilitating transfer of the substrate from the groove. The tip 76 is positioned on an upstream side of the molding nip. In this example, horn 40 is configured so that tip 76 is positioned just upstream of a plane containing the rotational axes of both the pressure roll and the mold roll. The tip 76 is preferably sufficiently close to the center of the nip that the sliding pleat remains intact, and the portions of the substrate carried on the lands of the pressure roll remain flat, during the molding process.

Figure 12:
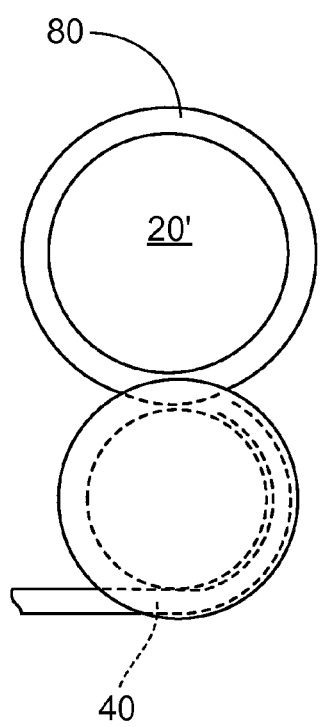
FIGS. 12 and 13 are schematic end and side views, respectively, of an alternate mold/pressure roll arrangement, with flanges protruding from the mold roll.
Figure 13:
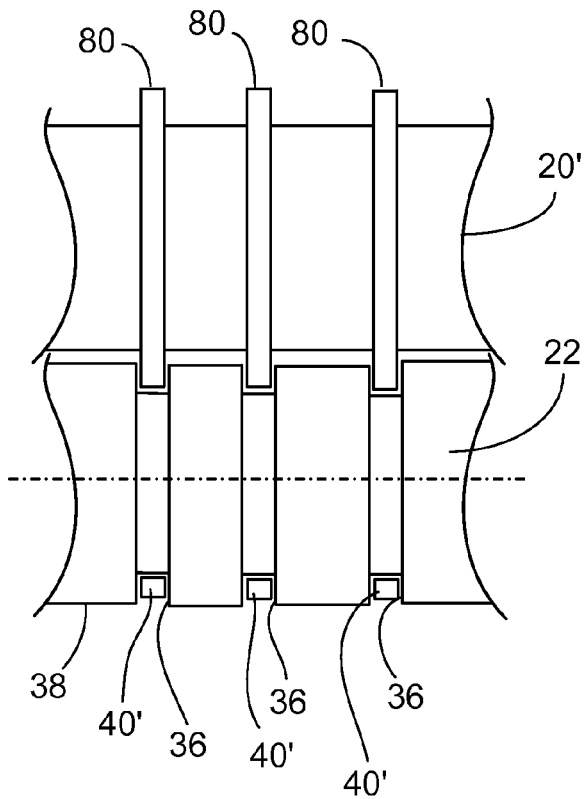
Figure 14:
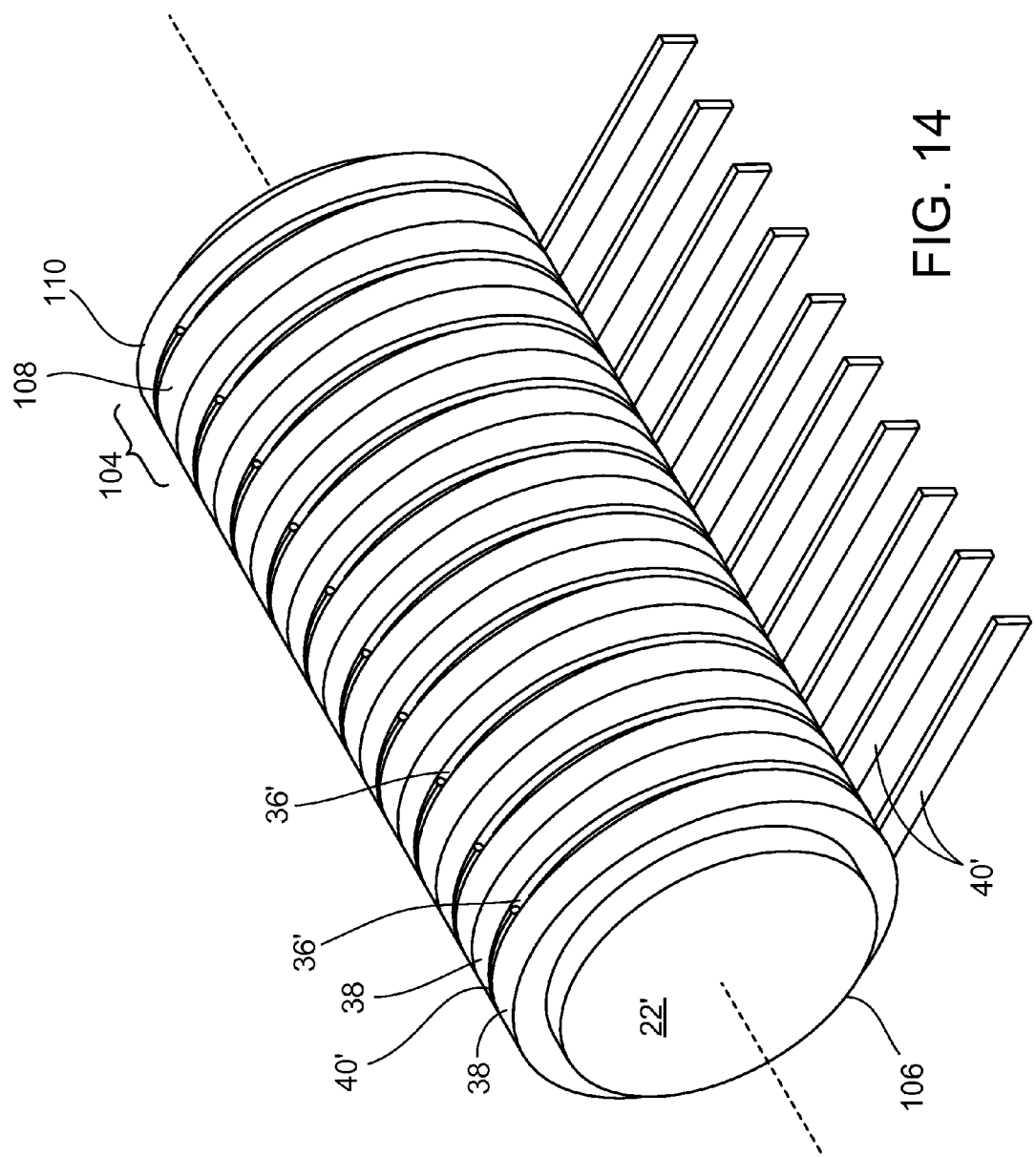
FIG. 14 is a perspective view of another pressure roll assembly.

Referring to FIGS. 12 and 13, in another example the mold roll 20' includes radially-extending flanges 80 configured to be received in the grooves 36 of the pressure roll 22. The flanges protrude radially outward from the surface of the mold roll defining the mold cavities, and are spaced apart along the longitudinal axis of the mold roll in registration with the pressure roll grooves 36. The pleating horns 40' are correspondingly shortened so as to avoid contact with the flanges. As the pleated substrate is transferred from pressure roll 22 to mold roll 20', each of the pleats of the substrate transfers from sliding over its horn 40' to being carried on the mold roll, enveloping a flange 80.

As will be appreciated, the center of the pleat travels along a path that, as it enters the molding nip, is shorter than the corresponding path traveled by those portions of the substrate on the lands 38 of the pressure roll. Sufficient space should be provided at the base of the pressure roll grooves to accommodate some bunching or buckling of the pleat top. Similarly, the center of the pleat travels along a path that, as it exits the nip and continues about the mold roll, is longer than the path traveled by those portions of the substrate on the mold roll surface, the path having a greater path radius. Consequently, there may be some stretching of the pleat on the mold roll, particularly if it is held outward on a flange 80 as in this example. Thus, some substrate elasticity may be beneficial when using a flanged mold roll. When using a mold roll without flanges, the flanges may fold to lie against the substrate on the mold roll surface while traveling about the mold roll.

The above examples have been illustrated with two or three grooves and a horn in each groove, but other configurations are envisioned. For example, the pressure roll may define anywhere from one groove to several (e.g., 20) grooves, and horns may be provided in all or a subset of the grooves, depending on the desired pleating arrangement. Similarly, the radial width of each horn may be selected (such as by varying the radius of the inner horn surface) to provide a desired pleat depth, irrespective of groove depth. The number of horns employed may be determined by the application. For example, when the resin is applied to the substrate in longitudinally extending lanes, sufficient horns are employed to form pleats that alternate with laminated regions.

Figure 15:
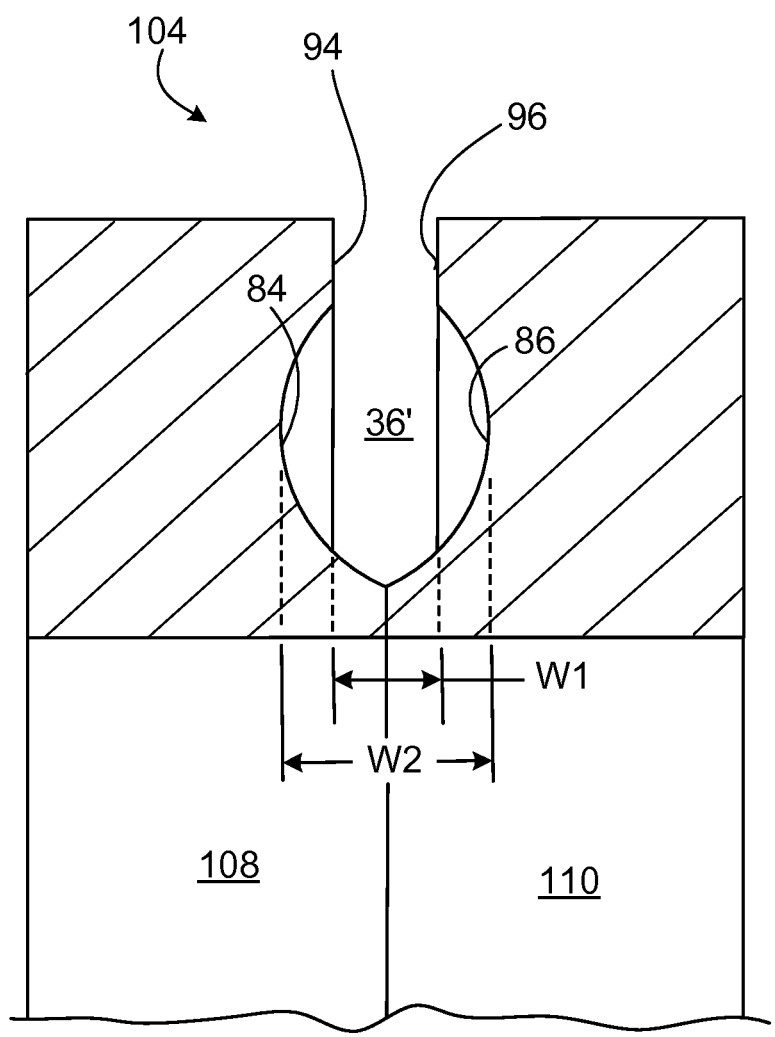
FIG. 15 is a partial cross-section of an edge portion of a ring pair of the pressure roll of FIG. 14.
Figure 16:
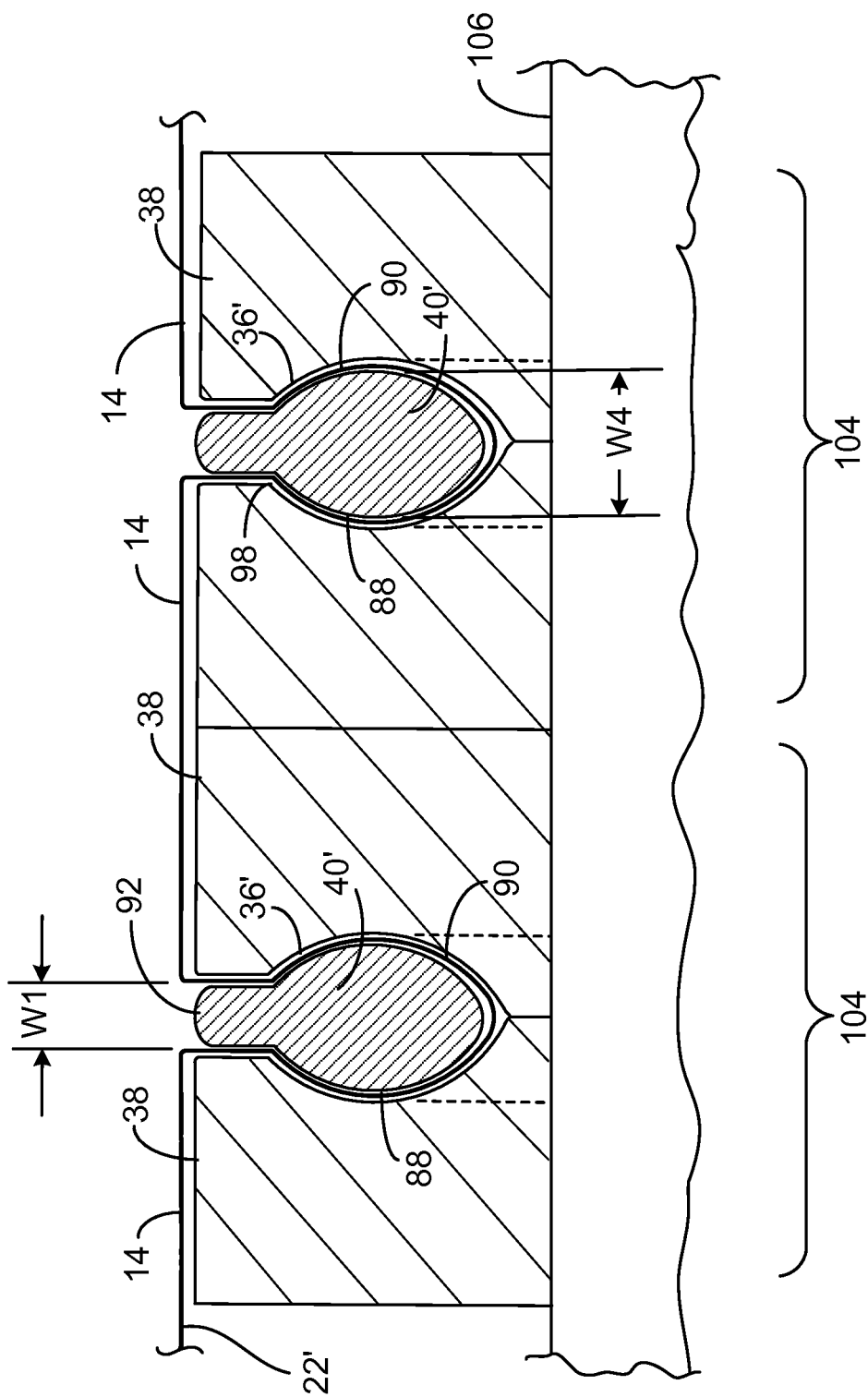
FIG. 16 is a partial cross-section through two ring pairs of the pressure roll of FIG. 14, with the horns disposed in the grooves and a substrate trained between the horns and grooves.

The above examples all feature rectangular groove profiles, with horns that can be inserted into the grooves after pressure roll assembly. In the example of FIGS. 14-19, the grooves and horns are shaped with cooperating, non-rectangular profiles. Pressure roll 22' defines grooves 36' that are formed so as to have a non-uniform longitudinal width. In this example, grooves 36' are partially defined between opposed, concave annular roll surfaces 84 and 86 (FIG. 15). As a result, the grooves have a longitudinal width W1 or gap at the surface of pressure roll 22' that is smaller than a maximum longitudinal width W2 of the groove, below the surface of the roll. Referring to FIGS. 15 and 16, each groove 36' receives a horn 40' having convex side surfaces 88, 90 that nest within the concave annular roll surfaces 84, 86. A parallel-sided outer section 92 of the horn fits between flat opposing outer annular surface sections 94, 96 defining the outer portion of groove 36', keeping the base portions of the pleats separated. Within each pleat the substrate is forced to adopt a shape including a bend 98 between a straight outer portion and a curved inner portion that slides along the bulbous section of the horn. The path of substrate 14 is schematically illustrated in FIG. 15. In practice, longitudinal tension will keep the substrate flat against the lands 38 of the pressure roll, while residual transverse tension will help keep the substrate against the inner surfaces of the horns.

Referring also to FIGS. 17-19, horns 40' have a cross-section that varies along their length, enabling them to remain stationary in the grooves while the pressure roll rolls about them. The cross-section at introducing end 70' is generally rectangular (with a convex upper surface), and of an overall width W3 less than the width W1 of the openings of the grooves (FIG. 15). In the curved section 100 of the horn, the cross-section transitions from the flat-sided cross-section of the introducing end 70' to the bulbous cross-section of width W4 shown in FIG. 16. The transition occurs completely within the pressure roll groove. At the releasing end 72' the radial width of the horn reduces in approach to tip 76', with the inner surface 74' of the horn transitioning to a flat tapered surface 102.

To facilitate assembly of the horns 40' within grooves 36', the outer portion of pressure roll 22' is formed as a stack of annular rings arranged in ring pairs 104 arranged sequentially along the pressure roll longitudinal axis. The ring pairs 104 are supported on a mandrel 106, and each ring pair 104 includes two juxtaposed rings 108, 110. Each ring 108, 110 has flat side surfaces that bear against side surfaces of the adjacent rings in the stack, and the entire stack is held under axial compression. One side of each ring is shaped to define a portion of a channel 36'. In this example, the profile of the channel-forming portion of each ring is mirrored in the profile of the channel-forming portion of the other ring of the pair, with the two rings defining one groove 36' therebetween. In this manner, each ring pair 104 features a generally central groove 36'. The overall width of each pressure roll ring, and each ring pair, is selected to position each groove as desired, such as aligned with a space between nip molding zones or between mold roll mold ring sets. As will be appreciated, pressure roll 22' must be assembled with the horns 40' already disposed in grooves 36'. This may be accomplished by preassembling each ring pair 104 with the horn disposed within the groove, or by assembling the pressure roll one ring at a time, placing the horns as the ring pairs are joined. Once the assembled pressure roll is installed on its rotational mounts in the molding apparatus, the introducing ends of the horns, extending from the grooves, can be secured to their support framework and thus held within the grooves but not contacting the pressure roll surfaces.

One of the advantages of employing a horn with a greater thickness than the opening width of the groove is that, in some cases, a pleat can be formed that comprises a substrate width greater even than the sum of twice the groove depth plus the groove opening width. In other words, an even greater pleat width can be accommodated than would be accommodated in a rectangular-section groove of similar depth and opening width. Also, in some cases the groove opening width W1 can be minimized to little more than the minimum horn introducing end width necessary to hold the horn in position.

Figure 20:
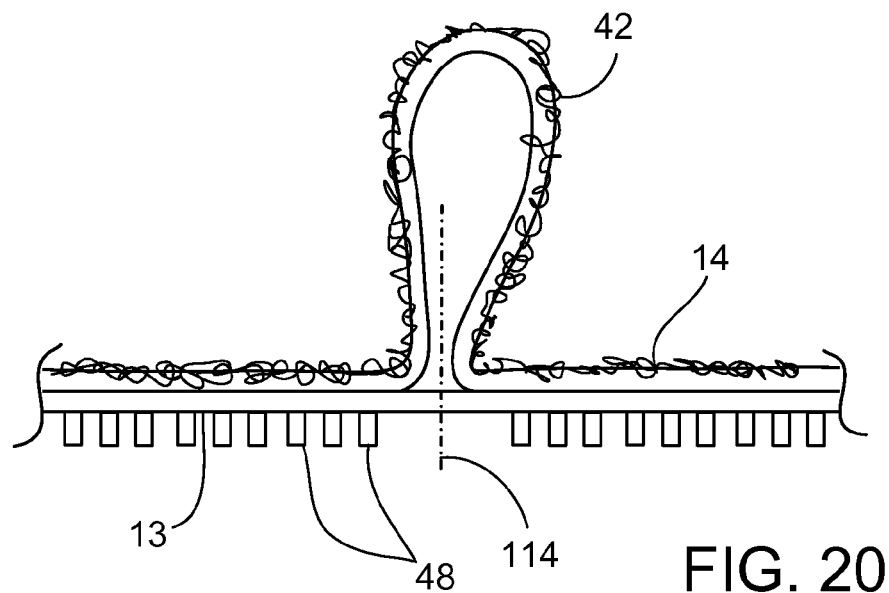
FIGS. 20 and 21 illustrate a pleat spanned by a resin base layer, before and after slitting the base layer at the pleat, respectively.
Figure 21:
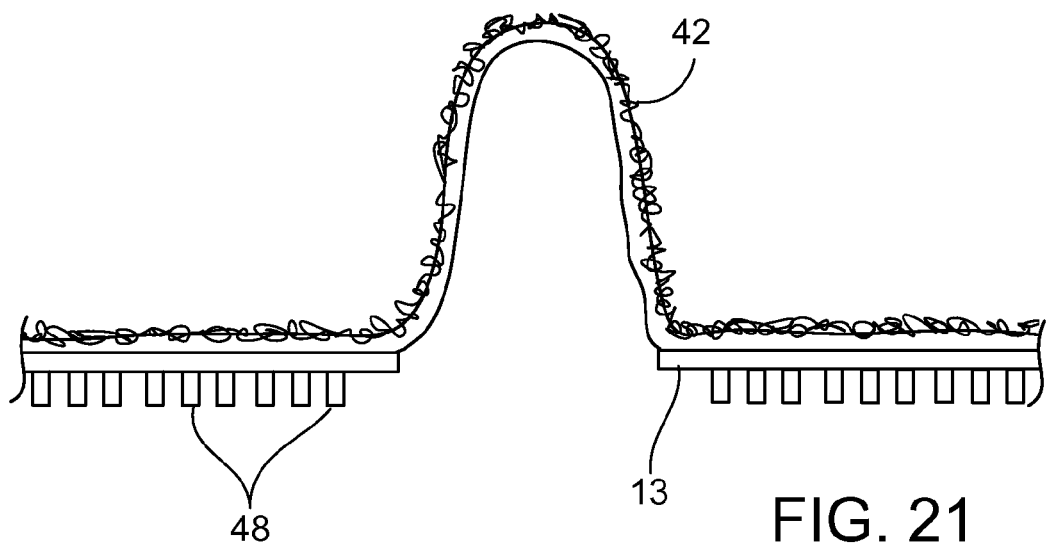

As mentioned above, in some cases resin is introduced across the full width of the mold roll, or at least across one of the pleating grooves. Referring to FIGS. 20 and 21, resin introduced to the nip across one of the pressure roll grooves forms a base 13 extending across a pleat 42 of the substrate and keeping the base of the pleat from opening or expanding. Such a product can be used as it is, or the base can be slit between sides of the pleat, such as along line 114, and the pleat then opened partially, as in FIG. 21, or fully to form a flat product. Such slitting and opening can be done after molding and prior to spooling.

Referring back to FIGS. 1 and 2, after being stripped from mold roll 20 by stripper roll 32, the laminated product 10 is spooled. In some cases, the product is expanded widthwise by a spreading roll 34, to eliminate the pleats and place the product in the form shown in FIG. 1 prior to spooling. Such an unpleated, sheet-form product may have longitudinal lanes in which the product has a greater thickness than in regions between the lanes. When such a product is spooled in straight-wound, such as to create a spooled width the same as the width of the laminate entering the spool, the longitudinal, relatively thick laminated regions will tend to stack during spooling, and may cause the layers of the spooled product to shift axially, resulting in a poorly spooled and unstable package. Even when the product is spiral-wound, such that the longitudinal laminated regions cross one another within the spooled product, there will be regions with greater and lesser radial compression between adjacent courses, resulting from density variation within the spooled product.

Figure 22A:
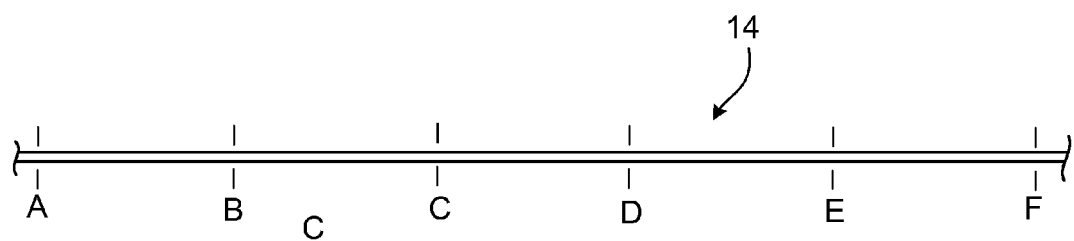
FIGS. 22A-22D sequentially illustrate pleating, laminating, folding and spooling of a substrate.
Figure 22B:
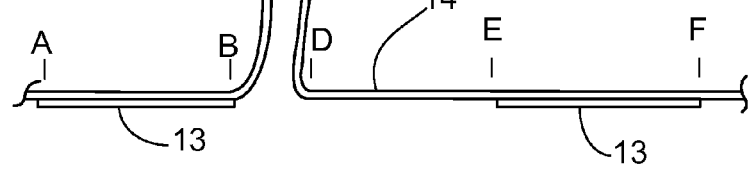
Figure 22C:
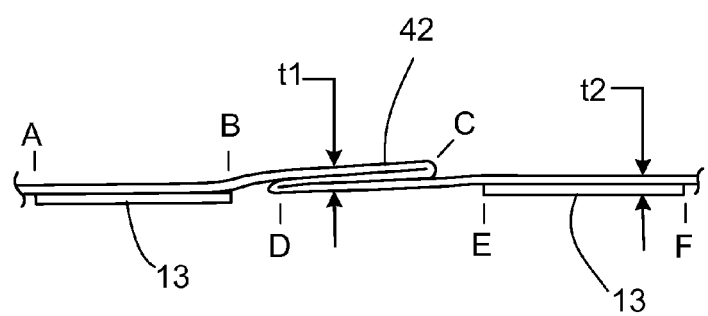
Figure 22D:
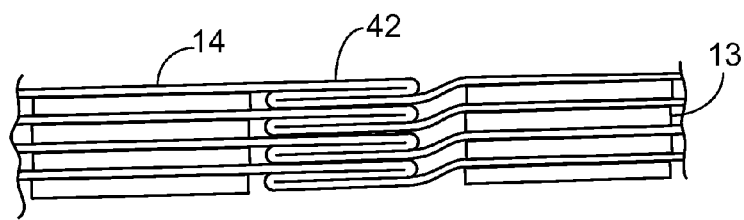

FIGS. 22A-D sequentially illustrate one advantageous pleat-processing method in which the folded pleats help to maintain the stability of the spooled finished product. The substrate section of FIG. 22A is marked to show the location of points A through F, spaced across the width of the substrate section. As the substrate is trained about the pressure roll, pleat 42 is formed of the longitudinal section B-D of the substrate section, as shown in FIG. 22B. In the molding nip, bases 13 are laminated across sections A-B and E-F, while section D-E remains on the pressure roll surface but not engaged by molten resin. The bases 13 may be formed with projecting fastener elements (not shown in these figures) or may be a flat layer of plastic that adds to the thickness of the laminate in those sections. As shown, the pleat is not formed centrally between bases 13, but closer to one of the bases spanning the unlaminated region of substrate. After molding, pleat 42 is folded against the back of section D-E, such that point C overlays the back side of the substrate between D and E, as shown in FIG. 22C. The width of the folded laminate bounded by D, on one hand, and C on the other thus has the equivalent thickness t1 of three layers of substrate 14. Preferably, this equivalent thickness approximates the laminate thickness t2 at bases 13, such that as courses of the folded product are spooled under some tension, the radial compression between courses in the folded region will approximate the radial compression between the stacked laminated regions, as shown in FIG. 22D. As compared to spooling the laminated product without folded pleats, such a spooling technique can increase the spooled density of the product as well as increase the stability of the product against longitudinal shifting during handling and transport. Even in cases where the equivalent thickness t1 of the folded laminate is significantly less (or more) than the thickness t2 of the laminated sections, simply spooling the product with the bases closer together than without folding can aid in stability. While this example features a single fold, resulting in a three-layer folded region, in products with a particularly thin substrate (as compared to the thickness t2 of the laminated regions), the pleats may be creased and folded over onto themselves, to produce five, or even seven, substrate layers in a region between the bases. Bases 13 may be longitudinally continuous, or may represent longitudinal substrate regions each carrying spaced-apart islands of resin. While FIG. 22D shows bases 13 of each course overlaying and aligned with each other, even when the product is spirally wound the reduction in thickness variation obtained by the above folded pleat spooling method can increase spool stability and density, thereby reducing overall spool size for a given length and width of the product.

In some cases the continuous laminate is not directly spooled as shown in FIG. 2, but is rather slit into widths, or processed into discrete fastener products. For example, discrete products can be die cut from the laminate, such as discrete diaper tabs each having a portion of one of the fastener lanes of the laminate and a portion of a resin-free section of the substrate. The continuous laminate may be cut widthwise to form elongated products having portions of the fastener lanes extending across their width, such as to function as a bandage.

The substrate 14 of the above examples above can be, or can include as a layer, a knit, woven or non-woven fabric, which may or may not have exposed surface fibers suitable for releasable hook engagement, such as by fastener elements formed by the methods above. Examples of loop materials useful as the substrate are neck bonded laminates (NBL), point-unbonded non-woven materials (PUB), spunbond non-woven materials (hereafter referred to as spunbond), spunbond-meltblown-spunbond multi-layer laminates (SMS), stretched bonded laminates (SBL), and meltblown non-woven, or air laid or air formed non-woven materials. NBL is a composite elastic necked-bonded material including at least one necked material joined to at least one elastic sheet. By 'necked-bonded laminate' we mean a laminate material formed by bonding a necked material to an elastic sheet material, where the term "necked material" refers to any material which has been narrowed in at least one dimension by application of a tensioning force. Examples of NBL materials are described by Mormon in U.S. Pat. No. 5,226,992. PUB is a fabric pattern having continuous thermally bonded areas defining a plurality of discrete unbonded areas. PUB is described by McCormack et al. in U.S. Pat. No. 5,964,742. Spunbond refers to a nonwoven web of spunbond fibers that is produced by melt spinning. The spunbond fibers are small diameter fibers which are formed by extruding molten thermoplastic material as filaments from a plurality of fine, usually circular capillaries of a spinneret, with the diameter of the extruded filaments then being rapidly reduced as, for example, by Appel et al. in U.S. Pat. No. 4,340,563. Spunbond nonwoven material can be formed from polyester, nylon, or polyolefins. SMS is a laminate with three layers: spunbond, meltblown, and spunbond. Such a laminate may be made by sequentially depositing onto a moving forming belt first a spunbond fabric layer, then a meltblown fabric layer and last another spunbond layer and then bonding the laminate such as by thermal point bonding. SMS materials are taught by Brock et al. in U.S. Pat. No. 4,041,203. SBL can be formed by tensioning an elastomeric sheet material and bonding a gatherable web (e.g., a spunbond polypropylene web) to the tensioned sheet material by application of pressure, the bonding being accomplished due to the adhesiveness of the elastomeric sheet material and without application of heat for softening the sheet material and/or gatherable web. SBL is described by Kieffer et al. in U.S. Pat. No. 4,789,699. The contents of each of the U.S. patents referenced in this paragraph are hereby incorporated by reference in their entirety, as they relate to the characteristics of such materials and their process of manufacture, to the extent that they are consistent with the rest of this specification.

In some cases the substrate will be air-permeable, and in other cases it may be provided with a film backing, such as of a material that promotes bonding to the extruded resin in the molding nip. Substrate 14 can also be formed from plastic polymer film or paper, such as polymer coated paper, or may be a combination of these materials. The substrate may be elastic in the widthwise direction and relatively inelastic in the longitudinal or machine direction. Widthwise elasticity may facilitate formation of the pleats about the horns and holding of the substrate taut against the lands of the pressure roll, in some cases.

Figure 23:
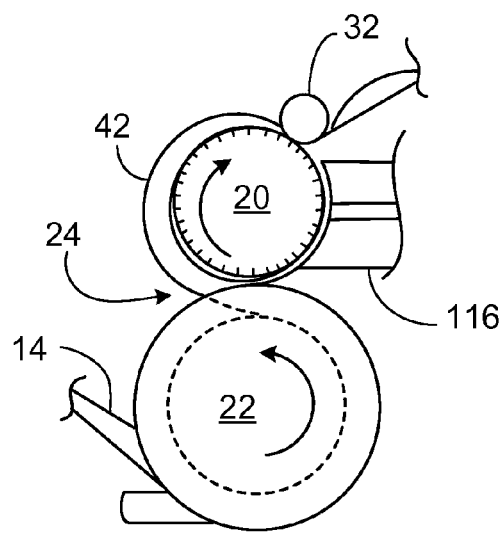
FIG. 23 illustrates an alternate apparatus and method for forming hooks on a pleated substrate.

The moldable resin 26 introduced to the molding nip (FIG. 2) can be or comprise, for example, polyethylene in any of its versions, polypropylene, poly vinyl chloride (PVC), polyamide, polyester, thermoplastic olefin or thermoplastic elastomer. In the apparatus shown in FIG. 2, the resin is extruded through a flat die, either as a continuous width or as parallel flows spaced along the nip length, such as formed through a deckled die. Under pressure produced in nip 24, the resin becomes in situ laminated to the substrate 14 in the nip. In the alternate apparatus configuration of FIG. 23, the resin is applied under pressure to the surface of mold roll 20 upstream of nip 24, such as by a pressure shoe 116. Pressure applied at the pressure shoe forces the resin to fill the mold cavities of mold roll 20, while a layer of resin is formed on the surface of the mold roll and comes into contact with substrate 14 at nip 24, preferably while the exposed surface of the resin layer is still at a temperature that allows the resin layer to flow in nip 24 to at least partially penetrate the substrate surface under nip pressure. In some examples, with either apparatus, the resin extends across the pleats, with the molded resin separated at the pleats in a subsequent step, to permit the substrate to return to its unpleated width.

The apparatus and methods described above for producing and passing longitudinal pleats through a processing nip can also be employed in methods that do not involve resin lamination or molding. For example, if a surface of a pre-formed substrate is to be processed only in discrete, separated, longitudinally continuous regions, the substrate may be pleated, either temporarily or permanently, with the pleats disposed in a grooved roll as discussed above. The portions of the substrate remaining on the surface of the grooved roll can be processed, either in a pressure nip or by engagement with the surface of a roll onto which the pleated substrate is passed from the grooved roll. For example, an apparatus similar to the one shown in FIG. 2 but without mold cavities in roll 20, can be employed to process discrete longitudinal sections of a substrate by pressure applied in nip 24, and/or by heat applied by the surface of roll 20 over the length of time the substrate remains on the roll, without similarly processing the longitudinal substrate sections forming the pleats. Thus, the methods described herein can be employed in substrate heat treatment and flattening procedures.

One benefit of the processing methods described above is that they can be employed to process discrete, longitudinal regions of a substrate with a processing zone of shorter overall width than the width of the substrate. In this manner, wider laminates may be produced, for example. When employed to make fastener products, fastening lanes may be provided in multiple regions across wider substrates. From such laminates wider finished products, such as curtains or hospital gowns, may be fashioned.

Figure 25:
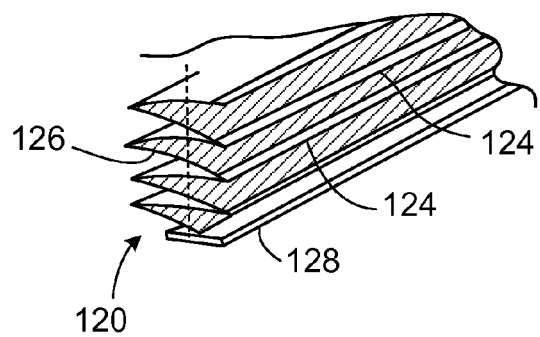
FIG. 25 shows the window blind of FIG. 24 in a retracted position.
Figure 24:
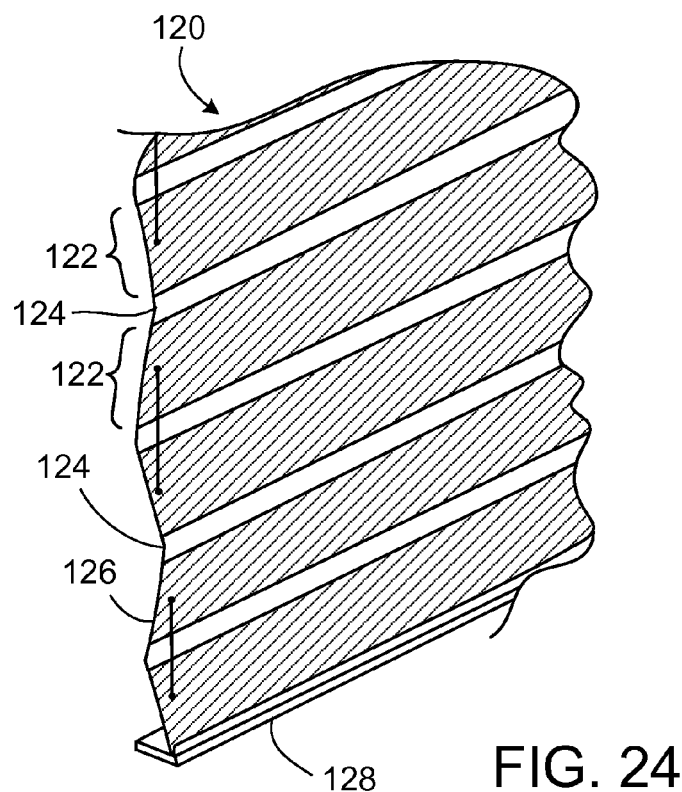
FIG. 24 is a partial perspective view of a window blind in an extended position.

Referring to FIGS. 24 and 25, window blinds 120 are formed from a laminate produced by the above methods, with a thin resin layer laminated across regions 122 to a fabric substrate. The resin in regions 122 stiffens the fabric substrate, as compared to those resin-free regions 124 between the resin lanes, and may also provide coloration, texture, and/or structural reinforcement to the substrate. The processed laminate is cut transversely to form the blinds, such that the longitudinal regions 122 extend horizontally in the hung blinds. The resin-free regions 124 of the substrate, which were held in grooves as the fabric substrate was passed through a lamination nip to apply the resin in regions 122, form bend points in the finished blinds. A cord 126 is secured to a rigid frame 128 extending across the bottom of the blinds, to which the lower edge of the substrate is attached. A similar cord is provided at the other end of the blinds (not shown). When the cords are raised, the blinds fold along resin-free regions 124, due to the difference in stiffness between the resin regions and the resin-free regions, causing the blinds to assume a folded, accordion structure in their raised condition.

A selected number of examples of the invention are described above in some detail. It should be understood that other examples will be apparent from the above description and may fall within the following claims.

What is claimed is:
1. A method of forming a longitudinally continuous sheet of pleated product, the method comprising:
    training a substrate about a first roll having an outer surface defining a circumferential groove between outer surface lands such that, as the substrate approaches a nip between the first roll and a second roll,
        a first region of the substrate is disposed within the groove so as to reside between the first roll and a stationary horn extending into the groove, and
        adjacent, second regions of the substrate extend across the lands on each side of the groove;
    passing the substrate through the nip in a machine feed direction with the first region disposed within the groove, thereby applying nip pressure to the second regions of the substrate in the nip;
    transferring the substrate to the second roll at the nip; and
    maintaining the transferred substrate against the second roll over a distance extending from the nip, over which distance the second regions of the substrate are sup- ported by an outer surface of the second roll and the first region forms a pleat on a side of the substrate opposite the second roll.

2. The method of claim 1, further comprising introducing a resin into the nip with the substrate, and bonding the extruded resin to the substrate.

3. The method of claim 2, wherein the resin is introduced to the nip in discrete, spaced-apart regions on either side of the groove.

4. The method of claim 2, wherein the resin is introduced to the nip in a flow that extends across the groove and forms a layer of resin extending across the pleat.

5. The method of claim 4, further comprising longitudinally slitting the layer of resin extending across the pleat, to open the pleat.

6. The method of claim 1, wherein the horn has a lateral width, internal to the first roll, greater than a lateral opening width of the groove.

7. The method of claim 1, wherein the second roll defines discrete molding cavities extending into the second roll opposite the lands of the first roll, the method comprising forcing resin into the discrete molding cavities to mold fastener element stems extending from a layer of resin laminated to the substrate.

8. The method of claim 1, wherein the second roll includes a radially-extending flange extending into the groove of the first roll at the nip, and wherein the pleat envelops the flange as the substrate leaves the nip.

9. The method of claim 1, further comprising folding the pleat against an adjacent surface of the substrate downstream of the second roll, and then spooling the substrate with the pleat folded.

10. The method of claim 1, wherein the groove is one of a series of circumferential grooves defined in the outer surface of the first roll and into which grooves respective horns extend, and wherein training the substrate about the first roll comprises training the substrate such that, as the substrate approaches the nip, longitudinal, spaced-apart sections of the substrate are disposed within respective ones of the grooves and form respective, spaced-apart pleats on the side of the substrate opposite the second roll.

11. A method of spooling a longitudinally continuous, flexible sheet-form product of greater overall thickness in two spaced-apart regions than in a longitudinal region between the spaced-apart regions, the method comprising
    forming a longitudinal pleat of the product within the longitudinal region;
    folding the pleat against a surface of the product to form a longitudinally continuous section having at least three overlapping layers of the product disposed between the spaced-apart regions; and then
    spooling the product onto a roll to form a spool in which each successive course of the product overlays the folded pleat of a preceding course.

12. The method of claim 11, wherein the product comprises a width-wise continuous substrate extending across the spaced-apart regions and the longitudinal region, and layers of resin laminated to the substrate in the spaced-apart regions, and wherein the folded pleat is disposed between the layers of resin.

13. The method of claim 11, wherein with the pleat folded, the longitudinally continuous section having at least three overlapping layers of the product has a net thickness approximating the thickness of the product in the spaced-apart regions.

14. The method of claim 11, wherein the pleat is formed adjacent an edge of one of the two spaced-apart regions, and is formed to have an overall pleat height such that the pleat, as folded, extends to adjacent the other of the two spaced-apart regions.

15. The method of claim 11, wherein the product has multiple, spaced-apart regions of greater thickness than in longitudinal regions of the product between the spaced-apart regions, the method comprising forming and folding respective longitudinal pleats of the product in each of the longitudinal regions between the spaced-apart regions, prior to spooling the product.

* * * * *